June 14, 1966 F. E. MacSPADDEN 3,255,771
AIR FUELING SYSTEM

Filed Nov. 22, 1963 3 Sheets-Sheet 1

INVENTOR.
FLOYD E. MacSPADDEN
BY *William J. Miller*
ATTORNEY

June 14, 1966   F. E. MacSPADDEN   3,255,771
AIR FUELING SYSTEM

Filed Nov. 22, 1963   3 Sheets-Sheet 2

INVENTOR.
FLOYD E. MacSPADDEN
BY William J. Miller
ATTORNEY

June 14, 1966  F. E. MacSPADDEN  3,255,771
AIR FUELING SYSTEM
Filed Nov. 22, 1963
3 Sheets-Sheet 3

INVENTOR.
FLOYD E. MacSPADDEN
BY *William J. Miller*
ATTORNEY

United States Patent Office 3,255,771
Patented June 14, 1966

3,255,771
AIR FUELING SYSTEM
Floyd E. MacSpadden, Houston, Tex., assignor to Continental Oil Company, Ponca City, Okla., a corporation of Oklahoma
Filed Nov. 22, 1963, Ser. No. 325,634
9 Claims. (Cl. 137—355.12)

This invention relates to a fueling system for transferring fuel to aircraft from a permanent fuel storage installation at an airport. More particularly, but not by way of limitation, the present invention relates to a compact fueling system for quickly delivering clean aviation fuel to aircraft in an amount which is continuously indicated during such delivery on a meter which can be easily read by the operator accomplishing the fueling.

In systems which have previously been provided for fueling light aircraft, the equipment used in such systems has been heavy and bulky, and has usually been positioned with respect to the runway or apron of the airport so that aircraft must be manually moved by ground crews in approaching and leaving the fueling location. Moreover, the metering devices used in such systems for indicating the quantity of gasoline delivered have been mounted in a way which requires the aircraft to be positioned in one position, or in a relatively small number of positions, relative to the fueling system in order that the meter may be observed by the attendant who carries out the fueling. In many instances, the existing fueling systems do not provide, as an integral part of the system, any means for grounding the aircraft, and ground wires and connections must be provided by the aircraft, or carried as a separate unit by ground crews.

The present invention provides a small, compact aircraft fueling system which is constructed to afford maximum accessibility by aircraft, and which, in one embodiment, provides a rotatably mounted meter which may be turned to any desired position in order for personnel using the fueling system to easily view the meter during the course of the fueling. The fueling system also includes apparatus for grounding the aircraft which is compactly stored in the fueling system when not in use. The system includes means for thoroughly cleaning the fuel prior to delivering it to the tanks of the aircraft, and further includes means for removing entrained air from the fuel prior to its passage through the meter so as to improve the accuracy and reliability of the meter reading.

In one embodiment of the invention, the aircraft fueling system is constructed as a compact, portable hydrant cart which can be parked at the edge of the airport service apron and easily manually moved into the service area by one person. The need for mounting the fueling system on an engine propelled vehicle is thus eliminated. The portable cart fueling system may be connected to the hose connection on the fuel line from underground fuel storage tanks in the service area, and is capable of delivering gasoline at rates of up to about 120 gallons per minute. The compact hydrant cart fueling system includes coarse and fine filtering elements for cleaning the fuel, an air eliminator, a surge and thermal expansion relief means, a spring retractable hose reel and a static ground wire reel containing grounding wire or cable which may be used to ground an aircraft while fueling is in progress.

Another embodiment of the invention comprises a low profile, stationary aircraft fueling system which is compactly constructed with a height not exceeding three feet. Small aircraft of the private and business type may thus park in close proximity to the low profile fueling system with the wing projecting over and clearing the unit. This construction makes it possible for small aircraft of the type described to taxi up to the fueling system and to taxi away after being fueled without the requirement of ground crews for handling the plane and moving it to and from the fueling station. The cost of fueling it is thus substantially reduced. The low profile fueling system also includes a swivelly or rotatably mounted meter which may be rotated through 360° so that it may be viewed by personnel fueling the aircraft regardless of the position of the aircraft relative to the fueling system.

From the foregoing description of the invention, it will have become apparent that it is a major object of the present invention to provide a compact, highly useful aircraft fueling system which can be more easily and less expensively used for fueling of small aircraft than the types of fueling systems heretofore in use.

Another object of the present invention is to provide an aircraft fueling system which includes a metering device which may be viewed from any position during fueling, and which therefore permits greater flexibility in selecting a parking location for the aircraft relative to the fueling system during the fueling operation.

An additional object of the present invention is to provide a compact, relatively light weight aircraft fueling system which includes aircraft grounding means which may be compactly stored in the fueling system when not in use, and which may be used during fueling for grounding the aircraft and thus improving the safety with which the fueling operation may be carried out.

A further object of the present invention is to provide an aircraft fueling system which is portable, and may be easily moved by one person from a parking area adjacent the edge of the airport service apron to a fueling service area.

An additional object of the present invention is to provide a compact, light weight portable aircraft fueling system which may be quickly connected to existing airport fuel storage facilities and easily utilized to fuel aircraft of various sizes.

Another object of the present invention is to provide a low profile, stationary aircraft fueling system which is sufficiently small in its vertical dimension to permit most aircraft to park adjacent the fueling system with the wing of the aircraft extending over, and clearing, the fueling system.

Yet another object of the present invention is to provide an aircraft fueling system which is compact, of light weight and relatively simple construction, and which is characterized by a long and trouble-free service life.

In addition to the foregoing described objects and advantages, other objects and advantages will become apparent as the following detailed description of the invention is read in conjunction with the accompanying drawings which illustrate the invention.

Figure 1:
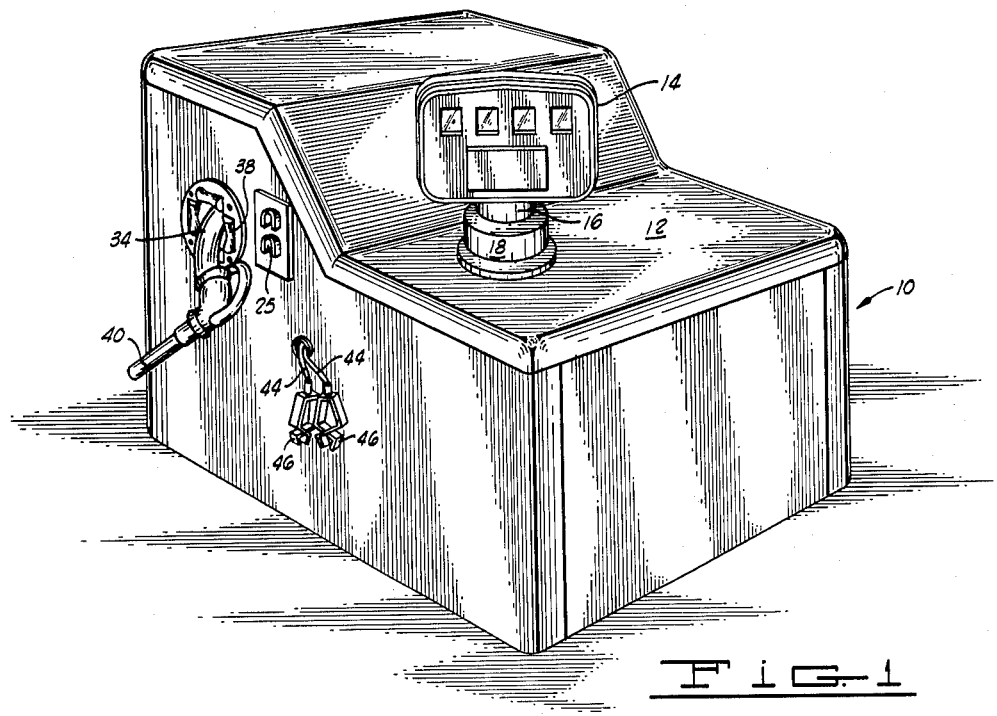
FIGURE 1 is a perspective view of the compact, low profile embodiment of the aircraft fueling system of the present invention.

Referring now to the drawings in detail, and particularly to FIGURE 1, the compact, low profile stationary embodiment of the invention comprises a housing designated generally by reference character 10. The housing 10 is shaped as illustrated in FIGURE 1 with the top panel 12 thereof relieved or stepped in the manner indicated. A meter counter 14 projects upwardly from the lower planar surface of the top panel 12, and is supported on a rotatably mounted shaft 16. The shaft 16 projects through a suitable bushing 18 on the top panel 12 into a meter body 20 located inside the housing 10 in the manner illustrated in FIGURE 2. The meter body 20 contains conventional fluid actuated elements (not shown) which are responsive to the passage of fuel through the meter body to energize or actuate the counter 14 which registers numerical indicia indicative of the volume of fuel which has been pumped through the meter. An important feature of the present invention is the employment in the cambination of the low profile fueling system of a meter, the counter of which is rotatably or swivelly mounted for pivotation through 360° to permit the meter reading to be observed by a person engaged in fueling an aircraft parked at any location around the fueling ssytem. One type of meter which is suitable for use in the invention is manufactured by the Ralph N. Brodie Co. of San Leandro, California.

Figure 3:
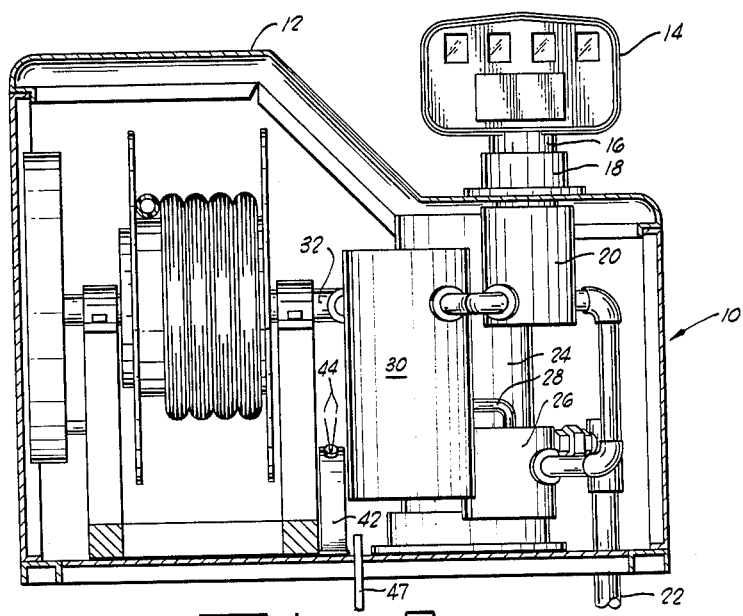
FIGURE 3 is a vertical sectional view taken along line 2—2 of FIGURE 2.
Figure 2:
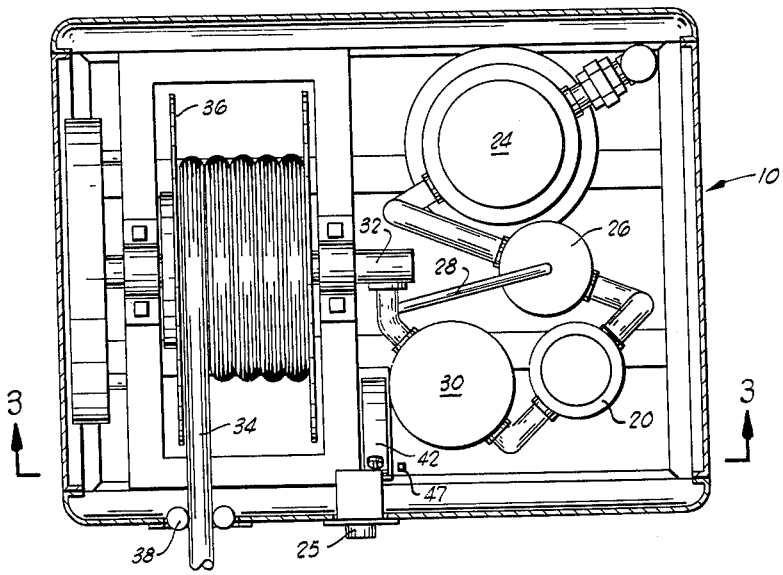
FIGURE 2 is a horizontal sectional view taken through the low profile embodiment of the invention illustrated in FIGURE 1 and somewhat schematically illustrating the several components of the fueling system.

The overall height of the low profile fueling system illustrated in FIGURES 1, 2 and 3 preferably does not exceed about three feet so that small aircraft of the private and business type may taxi close to the fueling system with the wing of the aircraft projecting over and clearing the fueling system if desired. The relative arrangement of the several components of the system as hereinafter described permits the height of the system to be reduced in comparison to the types of systems heretofore in use.

It will be noted in referring to FIGURE 1 that the particular stepped configuration of the top panel 12 permits the meter counter 14 to be rotated through 360° without coming into contact with, or encountering interference afforded by, the top panel. Moreover, the top panel configuration permits the meter counter 14 to be viewed from any angle around the fueling system, even when the viewer is at ground level.

The system which is used to pump, filter and meter the fuel is best illustrated in FIGURES 2 and 3. Since the embodiment of the invention illustrated in these figures is a permanent or stationary installation, a suitable conduit 22 is provided for connection with the pipe lines leading to underground fuel storage tanks (not shown). The conduit 22 conveys the fuel to a suitable centrifugal, self-priming pump 24 which can be omitted from the system in instances where the fuel storage network installed in a particular airport includes adequate pumping capacity. A suitable switch for energizing and de-energizing the pump is designated by reference character 25 (see FIGURE 1).

From the pump 24, the fuel is passed through a combination air eliminator and strainer 26 such as the type manufactured by the Ralph N. Brodie Co. of San Leandro, California. The air which is removed from the fuel by the air eliminator and strainer 26 may be vented to the atmosphere, but, for safety reasons, is preferably returned to the liquid fuel downstream from the meter body 20 by a small air conduit 28. In this way, entrained air is removed from the fuel passing through the meter, and thus an accurate measurement of the volumetric throughput of fuel may be obtained.

After passing through the meter body 20, the fuel is passed through a micronic filter 30 which removes extremely fine particles of sediment and deleterious solid particles which may be entrained in the fuel. The fuel is then passed through an axial pipe or conduit 32 into a flexible fuel hose 34 via a spring retractable hose reel 36. The spring retractable hose reel 36 is spring biased to rotate in a direction such that the flexible fuel hose 34 will be wound upon the reel when the reel is permitted to respond to the biasing influence of the spring. The hose 34 is passed through a plurality of rotatably mounted chocks or rollers 38 mounted in the housing 10 which function to maintain the hose in alignment with the reel 36, and to permit the hose to be easily withdrawn from the reel, or retracted and wound upon the reel after use. The free end of the gasoline hose 34 is attached to a suitable fuel dispensing nozzle 40 of the type well known in the art.

For the purpose of permitting the aircraft to be grounded while being fueled, a small, spring retractable ground wire reel 42 is provided adjacent the housing 10 and carries a pair of ground wires 44 having suitable clips 46 disposed at the free ends thereof. A ground wire reel which we have found suitable for use in the present invention is that manufactured by the Aero-Motive Manufacturing Company of Kalamazoo, Michigan, and designated Model 2040.

OPERATION

In using the low profile stationary fueling system illustrated in FIGURES 1 through 3, the aircraft to be fuel is taxied into close proximity to the low profile fueler with the wing projecting over the fueling system if such is desired or necessary in order to permit the aircraft to be parked closer to the system. The fueling personnel then pivot the meter counter 14 to a position in which it can be easily observed during the fueling operation. The ground wires 44 are unreeled to permit the clamps 46 to be clamped to the aircraft and to a grounding rod driven into the ground adjacent the fueling sysetm. The reel 42 is permanently grounded to the housing 10 and to a ground rod 47, thus affording a positive ground with equal potential on the entire system should one of the ground wires 44 not be connected to an external ground rod either through inadvertence or unavailability of such external grounding rod. The fuel hose 34 is then withdrawn from the housing 10.

Fuel is withdrawn from the stationary underground storage tanks either by means of a suitable pumping system associated with such tanks, or by the use of the centrifugal, self-priming pump 24 optionally included in the system of the present invention. The fuel is passed through the combination strainer-air eliminator 26 to remove coarse particles of sediment and entrained air therefrom. The air-free fuel is next metered to provide an indication of the volume delivered to the aircraft, and is then passed through the micronic filter 30 for a final filtering step in which very small solid particles are removed from the fuel. The fuel is fed radially from the axis of the retractable hose reel 36 into the hose 34 and is delivered via the hose and nozzle to the aircraft.

Figure 6:
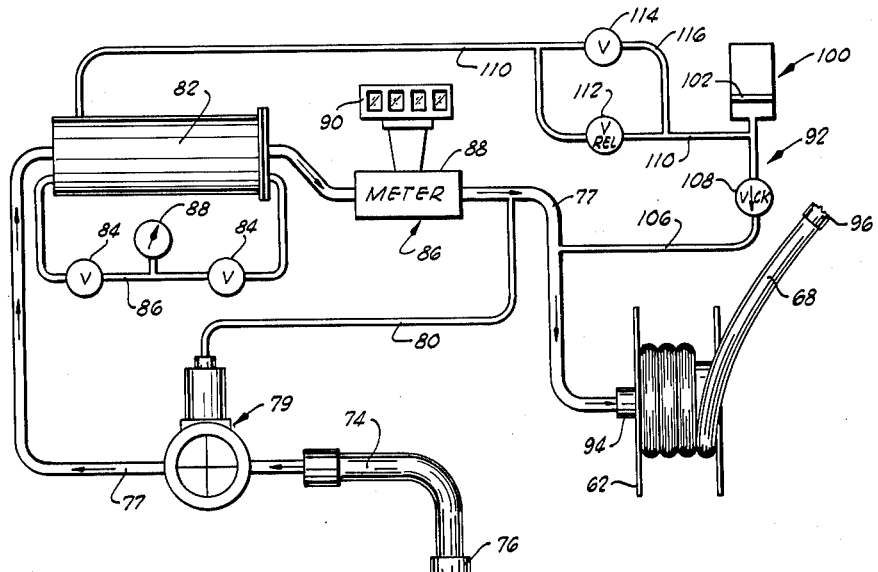
FIGURE 6 is a somewhat schematic flow diagram illustrating the relative arrangement of several components of the fuel dispensing system used in the portable hydrant cart fueling system illustrated in FIGURES 4 and 5.
Figure 4:
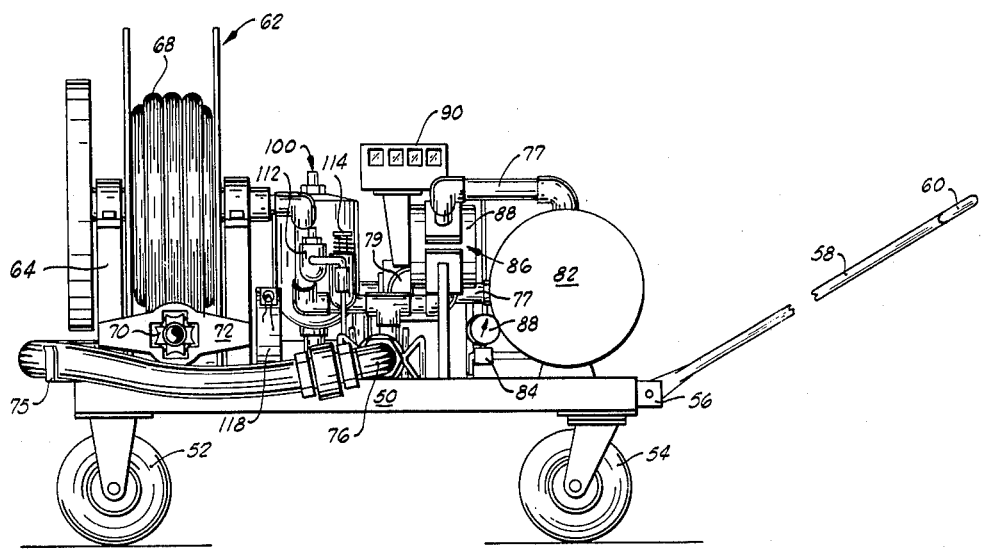
FIGURE 4 is a view in elevation of the compact, portable hydrant cart embodiment of the invention.
Figure 5:
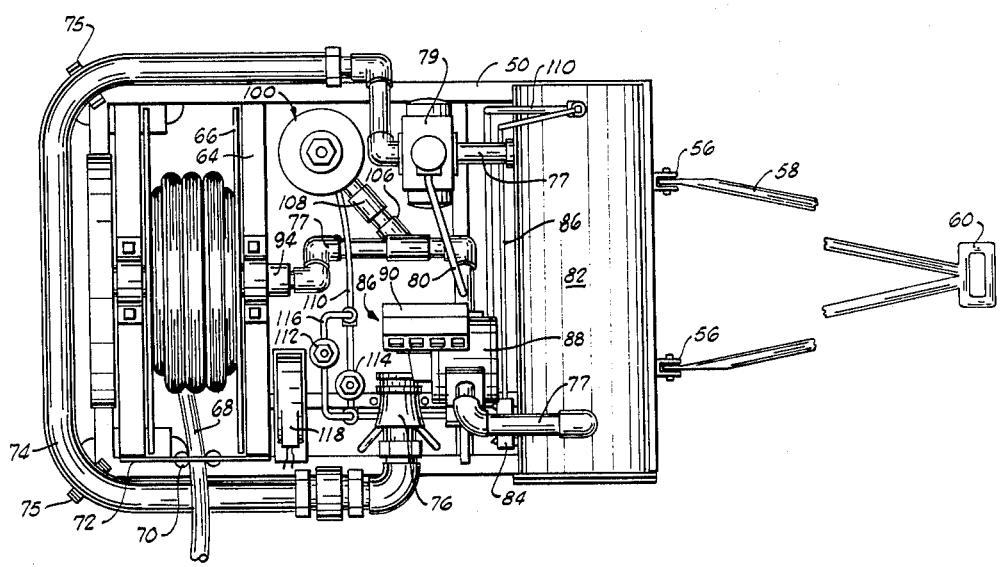
FIGURE 5 is a plan view of the portable hydrant cart illustrated in FIGURE 4.

A second embodiment of the invention is illustrated in FIGURES 4, 5 and 6. In this embodiment, the aircraft fueling system of the invention is constructed as a compact, portable hydrant cart and comprises a generally rectangular, horizontal bed platform 50 which is supported upon a pair of fixed wheels 52 at one end thereof, and a pair of swivelly mounted wheels 54 at the other end thereof. The bed platform 50 carries a pair of horizontally spaced bifurcated brackets 56 at the end at which the swivelly mounted wheels 54 are located, and the brackets 56 receive the ends of a handle or tongue structure 58. The tongue structure 58 has a hand grip 60 at the outer extremity thereof to permit the portable hydrant cart fueling system to be moved from one location to another.

Mounted on one end of the bed platform 50 in an upright position is a spring retractable hose reel designated generally by reference character 62. The hose reel 62 includes a stationary frame 64 which is bolted to the bed platform 50, and a spring biased reel drum 66 which is rotatably supported in the frame 64. Flexible fuel hose 68 is wound around the reel 66 and is led from the reel through four roller chocks 70 disposed as shown in FIGURE 4 to define an opening through which the flexible hose 68 is passed. The roller chocks 70 are rotatably mounted in a cross member 72 which extends across the frame 64 of the reel structure.

A schematic flow diagram portraying the path of flow of fuel through the aircraft fueling system illustrated in FIGURES 4 and 5 is illustrated in FIGURE 6. In referring to this figure, it will be perceived that a flexible intake hose 74 is provided at its free end with a hydrant coupling valve 76 to facilitate connecting the fueling system to a permanent hydrant (not shown) provided in association with underground fuel storage facilities of the conventional type. The flexible intake hose 74 is stored when not in use in a pair of open brackets 75 secured to the bed platform 50 of the hydrant cart.

The intake house 74 is connected to a main fuel conduit 77 which passes through a combination air eliminator and strainer device 79 such as the type manufactured by the Liquid Controls Corporation of North Chicago, Illinois. Air which is removed from the fuel is passed through a small bleed conduit 80 and reintroduced to the main fuel conduit 77 at a point downstream from elements of the system subsequently to be described. After passing through the combination air eliminator and strainer device 79, the fuel is passed through a micronic filter 82 which is utilized to remove fine particles of solids from the fuel. The pressure differential across the micronic filter is indicated by means of a pair of gate valves 84, a small conduit 86 connected across the ends of the micronic filter and a differential pressure gauge 88 positioned between the gate valves 84.

From the micronic filter 82, the fuel is passed into a meter device 86 which includes a meter body 88 and a counter 90. The meter body 88 contains movable elements responsive to the flow of fuel therethrough which are connected to and actuate the counter 90. The counter 90 visibly portrays indicia indicative of the volume of fuel which is passed through the meter 86. Just downstream from the meter device 86, the bleed conduit 80 re-enters the main fuel conduit 77. It will be perceived that the described arrangement permits the air which is entrained in the fuel to be removed by the combination air eliminator and strainer device 79 upstream from the meter 86 so that the reading of the counter 90 is not diminished in accuracy as a result of such entrained air being passed through the meter body 88.

The fuel next passes by a surge and thermal expansion relief system designated generally by reference character 92 and enters a pipe 94 extending axially through the hose reel 62. The flexible fuel hose 68 is connected to the axially extending pipe 94 in a manner well understood in the art and receives fuel therefrom for ultimate delivery via a nozzle 96 to the aircraft to be serviced.

The surge and thermal expansion relief system 92 includes an accumulator 100 which is of conventional construction and includes a flexible diaphragm 102 partitioning a chamber which contains in the upper portion thereof an inert gas and in the lower portion thereof a portion of the fuel being delivered by the system. The accumulator 100 is connected with the main fuel conduit 77 through a conduit 106 in which is positioned a check valve 108 permitting fuel to flow from the accumulator into the main fuel conduit, but preventing flow from the main fuel conduit to the accumulator. Connected to the conduit 106 at a point between the check valve 108 and the accumulator 100 is a small conduit 110 which is connected at its other end to the micronic filter 82. An adjustable pressure relief valve 112 is positioned in the conduit 110 and is connected in parallel with a manually actuated disc valve 114 positioned in by-pass conduit 116.

The several elements which have been schematically portrayed in FIGURE 6 are illustrated in FIGURES 4 and 5, and are designated by identical reference numerals to those used in FIGURE 6. The compact arrangement of the elements will be noted. In addition to the foregoing described elements used for filtering, metering and delivering the fuel, the portable hydrant cart fueling system also includes a ground wire reel designated by reference character 118. The ground wire reel 118 is spring biased so as to automatically retract the ground wires reeled thereon after they have been utilized for grounding an aircraft being fueled.

In the operation of the portable hydrant cart fueling system illustrated in FIGURES 4 through 6, a single operator may pull the hydrant cart to a fixed fueling position using the tongue 58. The hydrant cart is easily maneuverable as the result of the swivel mounting of the wheels 54, and the relatively compact light weight construction of the system. Upon arrival at the location where it is desired to fuel the aircraft, the hydrant coupling valve 76 is connected to a hydrant which is provided in association with the underground fuel storage tanks. The hydrant coupling valve 76 may be brought to the location of the hydrant by removing the large diameter hose 74 from its retaining brackets 75 and extending it in any direction desired from the bed platform 50. After the hose 74 has been connected to the hydrant through the hydrant coupling valve 76, a pump associated with the fuel storage tanks (not shown) may be energized at this time or may have been energized prior to moving the portable hydrant cart to the fueling position. The construction of the hydrant coupling valve 76 and the hydrant are of the dry break type permitting the two to be connected or disconnected with the pump energized and pressure on the distribution system from the fuel storage tanks. Fuel is pumped through the combination strainer and air eliminator 79 where solid particles and air are removed from the fuel. The air is by-passed around the meter 88 and reintroduced to the fuel downstream therefrom. The micronic filter 82 functions to remove fine sediment from the fuel. The meter 88 responds to the flow of fuel therethrough to register in numerical indicia on the counter 90 the volume of fuel passed therethrough. From the meter 88, the fuel is then passed into the pipe 94 which extends through the center of the hose reel 66 and supplies the fuel to the flexible fuel hose 68.

The surge and thermal expansion relief system 92 used in the fueling system of the present invention functions to relieve the fuel delivery lines and filtering and metering elements of the ssytem from excessive pressures resulting from intermittent surges, and from expansion of the volatile fuels due to thermal influences. The accumulator 100 is charged with nitrogen or other inert gas to a pressure which equals the normal no flow pressure of the system with the pump energized. The check valve 108 which is provided between the accumulator 100 and main fuel conduit 77 permits fuel to flow out of the accumulator into the fuel delivery system, but prevents flow from the system into the accumulator.

The pressure relief valve 112 is adjustable, and is preset to open at a pressure above the normal no flow pressure of the system as hereinbefore defined, but well below the critical design pressure of the system. When the accumulator 92 is of proper size, the pressure relief valve 112 functions to permit both surge and/or thermal expansion pressures developed in the system to be transmitted through the conduit 110 to the accumulator 100. When the surge or thermal influence causing the increase in pressure in the system is relieved, the accumulator discharges fuel through the check valve 108 to the main fuel conduit 77. Also, upon initial use of the fueling system and opening of the nozzle 96 at the end of the fuel delivery hose 68, any pressure in excess of normal operating pressure which has been developed in the accumulator will be relieved by discharging fuel through the check valve 108 into the main fuel conduit 77.

The manually actuated disc valve 114 functions to permit manual relief of system pressure upon the termination of the fueling operation so that the hose 68 may be more easily reeled upon the spring retractable hose reel 66. When the manually operable disc valve 114 is opened, excessive pressure resulting in the system from closure of the fuel nozzle or the locked-in pressure of the fuel storage pumping system may be relieved by compressing the gas in the accumulator 100. Pressure is thus taken off of the hose 68 so that it may be handled more easily during the operation of rewinding the hose on the hose reel.

From the foregoing description of the invention, it will be perceived that the present invention provides a novel, compact and highly useful fueling system for quickly and efficiently fueling aircraft of varying sizes and types. The system reduces the necessity for using ground crews to handle the aircraft in moving them to a fixed or stationary fueling location. Also, the system provides a meter which may be rotated to any position desired in order for the refueling personnel to easily observe the reading of the meter counter during the entire fueling operation. The fueling system of the invention includes a spring retractable ground wire reel which permits the airplane to be easily and quickly grounded even though a ground stake may not be in the immediate proximity of the aircraft. The fuel which is delivered to the aircraft is thoroughly cleaned by filters and strainers incorporated in the system prior to being delivered to the fuel tanks of the aircraft.

Although certain preferred embodiments of the invention have been described in the preceding specification in considerable detail with respect to specific structures, and arrangements of the several elements of the system relative to each other, it will be understood that numerous innovations and modifications may be made in the specific structure illustrated and described without departure from the basic principles which underlie the invention. It is therefore intended that insofar as changes or rearrangements which are made in the exemplary embodiments hereinbefore described do not result in a departure from the basic principles which underlie the invention, such changes and rearrangements shall be considered as encompassed within the spirit and scope of the present invention except as the same may be necessarily limited by the appended claims or reasonable equivalents thereof.

What is claimed is:

1. A portable aircraft fueling system comprising:
   a horizontal bed platform having an upper surface and a lower surface;
   a tongue attached to one side of said bed platform for pulling said bed platform horizontally;
   a first pair of wheels secured to the under surface of said bed platform;
   a second pair of wheels swivelly secured to the under surface of said bed platform and facilitating pivotation of said bed platform about a vertical axis;
   a hose reel mounted on said bed platform for rotation about a horizontal axis;
   a fuel hose on said hose reel;
   fixed guide means adjacent said hose reel for guiding said fuel hose when said hose is removed from and wound upon said reel;
   a main fuel conduit connected to said fuel hose through said reel and mounted on said bed platform;
   metering means interposed in said main fuel conduit for metering the volume of fuel passed therethrough;
   purifying means upstream from said metering means in said main fuel conduit for removing sediment and entrained air from said fuel, said means comprising:
      a combination strainer and air removal device for removing solid particles and air from said fuel;
      an air bleed conduit connected between said main fuel conduit at a point downstream from said metering means and said combination strainer and air removal device for by-passing air removed from said fuel around said metering means; and
      a micronic filter for removing from said fuel solid particles smaller than those removed by said strainer and air removal device;
   means for resiliently absorbing excessive liquid pressure in said fueling system resulting from surges and thermal expansion; and
   hydrant coupling means connected to said main fuel conduit for connecting said main fuel conduit to a hydrant associated with a permanent fuel storage facility.

2. A portable aircraft fueling system comprising:
   a horizontal bed platform having an upper surface and a lower surface;
   a tongue attached to one side of said bed platform for pulling said bed platform horizontally;
   a first pair of wheels secured to the under surface of said bed platform;
   a second pair of wheels swivelly secured to the under surface of said bed platform and facilitating pivotation of said bed platform about a vertical axis;
   a hose reel mounted on said bed platform for rotation about a horizontal axis;
   a fuel hose on said hose reel;
   fixed guide means adjacent said hose reel for guiding said fuel hose when said hose is removed from and wound upon said reel;
   a main fuel conduit connected to said fuel hose through said reel and mounted on said bed platform;
   metering means interposed in said main fuel conduit for metering the volume of fuel passed therethrough;
   purifying means upstream from said metering means in said main fuel conduit for removing sediment and entrained air from said fuel;
   means for resiliently absorbing excessive liquid pressure in said fueling system resulting from surges and thermal expansion, said means comprising:
      an accumulator;
      a first conduit connecting said accumulator with said main fuel conduit;
      a check valve interposed in the first conduit connecting said accumulator with said main fuel conduit and preventing flow of fuel from said main fuel conduit to said accumulator while permitting fuel flow from said accumulator to said main fuel conduit;
      conduit means having two ends and connected at one of its ends to said first conduit between said check valve and said accumulator and communicating at its other end with said main fuel conduit; and
      valve means in said conduit means for passing fuel through said conduit means and said first conduit to said accumulator to relieve undesirably high liquid pressures in said fueling system; and
   hydrant coupling means connected to said main fuel conduit for connecting said main fuel conduit to a hydrant associated with a permanent fuel storage facility.

3. A portable aircraft fueling system as claimed in claim 2 wherein said conduit means includes
   a second conduit connected at one end to said first conduit between said check valve and said accumulator and communicating at its other end with said main fuel conduit; and
   a third conduit connected at its ends to said second conduit at spaced points therealong between the ends of said second conduit; and
   wherein said valve means includes:
      a normally closed, automatically actuated pressure relief valve in said second conduit responsive to a liquid pressure in said main fuel conduit less than the critical design pressure of said fuel system in the absence of said liquid pressure absorbing means to open and thereby pass fuel to said accumulator; and
      a normally closed, manually openable valve in said third conduit for passing fuel to said accumulator when said manually openable valve is opened.

4. A portable aircraft fueling system as claimed in claim 2 wherein said purifying means comprises:
a combination strainer and air removal device for removing solid particles and air from said fuel;
an air bleed conduit connected between said main fuel conduit at a point downstream from said metering means and said combination strainer and air removal device for by-passing air removed from said fuel around said metering means; and
a micronic filter for removing from said fuel solid particles smaller than those removed by said strainer and air removal device.

5. A portable aircraft fueling system as claimed in claim 2 wherein said hydrant coupling means includes a flexible hose connected at one of its ends to said main fuel conduit and a hydrant coupling valve connected to the other end of said flexible hose.

6. An aircraft fueling system as claimed in claim 2 and further characterized to include a spring retractable ground wire reel mounted on said bed platform and having a pair of ground wires wound on said reel and electrically connected to each other; and
a clamp on the end of each of said ground wires for clamping said wires to aircraft and to a ground stake during fueling.

7. A fueling system comprising:
support means;
a hose reel rotatably mounted on said support means;
a fuel hose on said hose reel;
a main fuel conduit connected to said fuel hose through said reel and mounted on said support means;
metering means interposed in said main fuel conduit for metering the volume of fuel passed therethrough;
purifying means upstream from said metering means in said main fuel conduit, said purifying means comprising:
means for removing solid particles and air from said fuel;
an air bleed conduit connected between said main fuel conduit at a point downstream from said metering means and said means for removing solid particles and air from said fuel;
means for resiliently absorbing excessive liquid pressure in said fueling system; and
hydrant coupling means for connecting said main fuel conduit to a hydrant.

8. A fueling system comprising:
support means;
a hose reel rotatably mounted on said support means;
a fuel hose on said hose reel;
a main fuel conduit connected to said fuel hose through said reel and mounted on said support means;
metering means interposed in said main fuel conduit for metering the volume of fuel passed therethrough;
purifying means upstream from said metering means in said main fuel conduit;
means for resiliently absorbing excessive liquid pressure in said fueling system, said means comprising:
an accumulator;
a first conduit connecting said accumulator with said main fuel conduit;
a check valve interposed in the first conduit connecting said accumulator with said main fuel conduit and preventing flow of fuel from said main fuel conduit to said accumulator while permitting fuel flow from said accumulator to said main fuel conduit;
conduit means having two ends and connected at one of its ends to said first conduit between said check valve and said accumulator and communicating at its other end with said main fuel conduit; and
valve means in said conduit means for passing fuel through said conduit means and said first conduit to said accumulator to relieve undesirably high liquid pressures in said fueling system; and
hydrant coupling means for connecting said main fuel conduit to a hydrant.

9. A fueling system comprising:
support means;
a hose reel rotatably mounted on said support means;
a fuel hose on said hose reel;
a main fuel conduit connected to said fuel hose through said reel and mounted on said support means;
metering means interposed in said main fuel conduit for metering the volume of fuel passed therethrough;
purifying means upstream from said metering means in said main fuel conduit, said purifying means comprising:
means for removing solid particles and air from said fuel;
an air bleed conduit connected between said main fuel conduit at a point downstream from said metering means and said means for removing solid particles and air from said fuel;
means for resiliently absorbing excessive liquid pressure in said fueling system, said means comprising:
an accumulator;
a first conduit connecting said accumulator with said main fuel conduit;
a check valve interposed in the first conduit connecting said accumulator with said main fuel conduit and preventing flow of fuel from said main fuel conduit to said accumulator while permitting fuel flow from said accumulator to said main fuel conduit;
conduit means having two ends and connected at one of its ends to said first conduit between said check valve and said accumulator and communicating at its other end with said main fuel conduit; and
valve means in said conduit means for passing fuel through said conduit means and said first conduit to said accumulator to relieve undesirably high liquid pressures in said fueling system; and
hydrant coupling means for connecting said main fuel conduit to a hydrant.

References Cited by the Examiner
UNITED STATES PATENTS

| | | | |
|---|---|---|---|
| 2,013,431 | 9/1935 | Bechtold | 222—73 |
| 2,341,532 | 2/1944 | De Lancey | 222—23 |
| 2,353,206 | 7/1944 | Waugh | 222—72 |
| 2,583,181 | 1/1952 | Kunz | 137—355.26 X |
| 2,675,943 | 4/1954 | Daley et al. | 222—23 |
| 2,698,112 | 12/1954 | Herderhorst | 222—72 |
| 2,735,717 | 2/1956 | Harman | 137—355.12 |
| 2,938,650 | 5/1960 | Biber | 222—71 |

M. CARY NELSON, *Primary Examiner.*

H. KLINKSIEK, *Assistant Examiner.*